Figure 1:
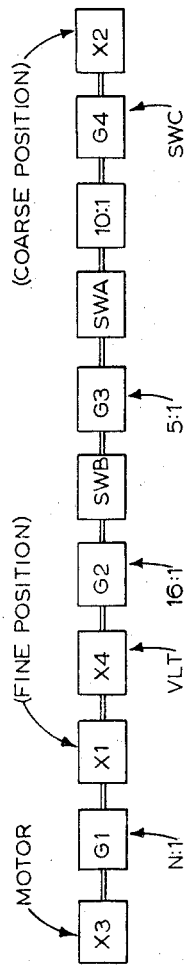

Jan. 24, 1961 R. E. SPENCER ET AL 2,969,489
AUTOMATIC CONTROL SERVOSYSTEM, ESPECIALLY FOR MACHINE TOOLS
Filed Nov. 2, 1956 3 Sheets-Sheet 1

Inventors
R. E. Spencer
J. H. Phillips
By Clarence Downing Seebold
Attys.

Inventors
R. E. Spencer
J. H. Phillips
By Glascock Downing Seebold
Attys

United States Patent Office 2,969,489
Patented Jan. 24, 1961

2,969,489

AUTOMATIC CONTROL SERVO SYSTEM, ESPECIALLY FOR MACHINE TOOLS

Rolf Edmund Spencer, London, and James Hugh Phillips, Cookham, England, assignors to Electric & Musical Industries Limited, Hayes, Middlesex, England, a company of Great Britain Filed Nov. 2, 1956, Ser. No. 620,144

Claims priority, application Great Britain Nov. 4, 1955

8 Claims. (Cl. 318—28)

This invention relates to automatic control systems, especially for machine tools.

In a proposed form of automatic control system for machine tools, signals are derived from a tape or other record and representing values of one co-ordinate at discrete reference points on a desired locus for the tool of the machine. From these derived signals a continuously variable electrical command signal is produced by interpolation and the command signal forms one input to servo means which are arranged to displace the tool or work-carrier in the respective co-ordinate direction. A position analogue unit is moreover arranged to set up an electrical signal representing the displacement imparted by the servo-means and this signal applied as feedback to the servo-means forms a second input thereto, the servo-means operating in known manner to tend to maintain equality between the command and feedback signals. It is often convenient to use a binary-decimal code for recording the signals, and it is then desirable to convert them into electrical analogue signals for storage and interpolation purposes. One apparatus for achieving such conversion is described in co-pending U.S. application Serial No. 620,145, filed November 2, 1956, and according to this application individual voltages are set up representing successive decimal digits of the recorded signals and these voltages are added by a series of step-down transformers to produce the desired analogue. Furthermore the unit for setting up the position analogue signal may also employ a series of transformers whose outputs represent the contribution of digits of different denominational orders and which are suitably combined to produce the desired analogue. Some forms of apparatus for producing a position analogue signal are described in U.S. patent application Serial No. 484,202.

An automatic control system of the kind described in the preceding paragraph is usually required to work with a high degree of accuracy and accuracies exceeding one part in 10,000 may be required. One method of obtaining a high accuracy is to arrange that the digital voltages which are summed to produce the analogue voltages are as large as possible. In other words, the voltage range covered by the highest denominational order used in building up the analogue voltage has to be large so as to allow many sub-divisions of this voltage range corresponding to digits of lower orders. Moreover there is a practical limit for the voltage range for the highest denominational order. A further increase in accuracy can be achieved by omitting the highest order digit or digits of the command and feedback signals provided that these digits change by only one unit during any period when the same reference points are in use. However, this expedient gives rise to a difficulty because, in the command or feedback signal, there is a jump in the value of the highest order retained digit from one extreme to the other each time an omitted digit changes value. Moreover, because of the existence of an error, a jump in the feedback signal may occur at a different time from a jump in the command signal, so that there may be intolerable discontinuity in the error signal. Assume, for example, that the retained digit of highest order in the command signal is eight and the corresponding digit of the position analogue signal is two. The difference sensed by the servo amplifier would then be plus six and unless precautions are taken, the servo motor would operate to displace the controlled component by six units in the positive direction, whereas in fact the required displacement may be four units in the negative direction. It may seem feasible to operate on the assumption that the error is always less than half the maximum value of the highest order retained digit in the command signal, and to make the operation conditional on a magnitude of the error, but such operation would also lead to substantial difficulties of a practical character where continuous control is essential.

The object of the present invention is to reduce the difficulties indicated in the preceding paragraph.

According to the present invention there is provided an automatic control system wherein a variable is controlled in response to an error signal derived by comparing a command signal and a feedback signal which represents the value of the variable, and wherein said command signal and said feedback signal are derived from output points of potential divider means, an output from which may represent corresponding points in successive ranges of variation of said variable, and wherein means are provided for virtually shifting the potential divider means to prevent the output points from passing an end of the potential divider means due to a change of the variable from one range to the other.

The present invention depends on the fact that the absolute values of the command and feedback signals are immaterial provided their difference is correct in magnitude and sign. Therefore it is immaterial where the output points are located on the potential divider means if their relative positions are correct. The voltage range of the potential divider means must of course be sufficient to cover the greatest difference likely to be encountered between the command and feedback signals, and assuming the difference may have either sign, the minimum voltage range is twice the greatest difference likely to be encountered. Preferably the shifting means is operative to maintain the output point for the feedback signal at or near the mid-point of the potential divider means.

By virtue of the invention no discontinuity or ambiguity can arise and any digit or digits of higher order can be neglected as far as the normal input to the servo amplifier is concerned. The neglected digit or digits may of course have to be taken into consideration on occasions, for example, with a new operation is being started but this can be achieved by employing a coarse control channel for the machine, without reducing the overall accuracy.

Figure 2A:
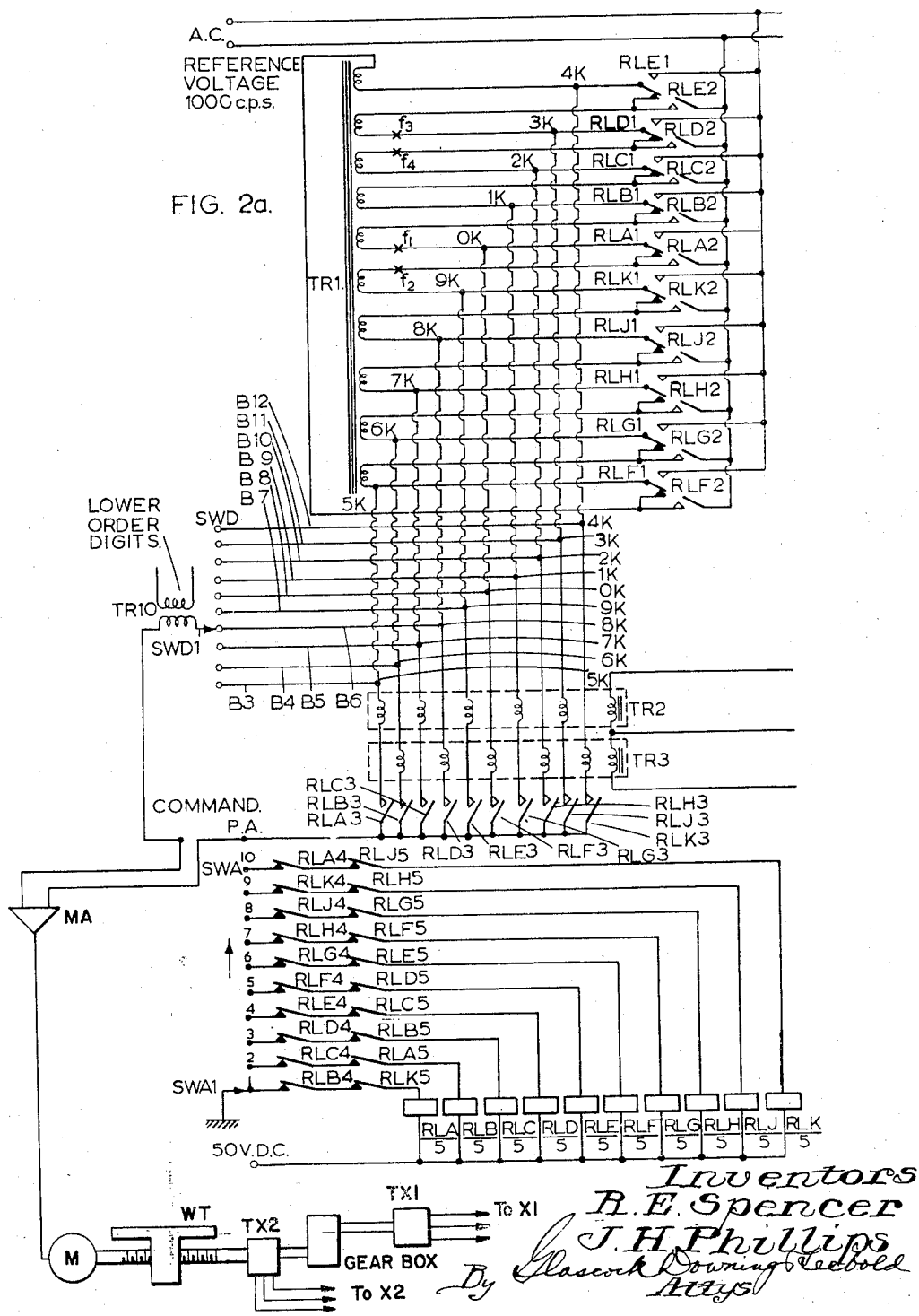
Figure 2B:
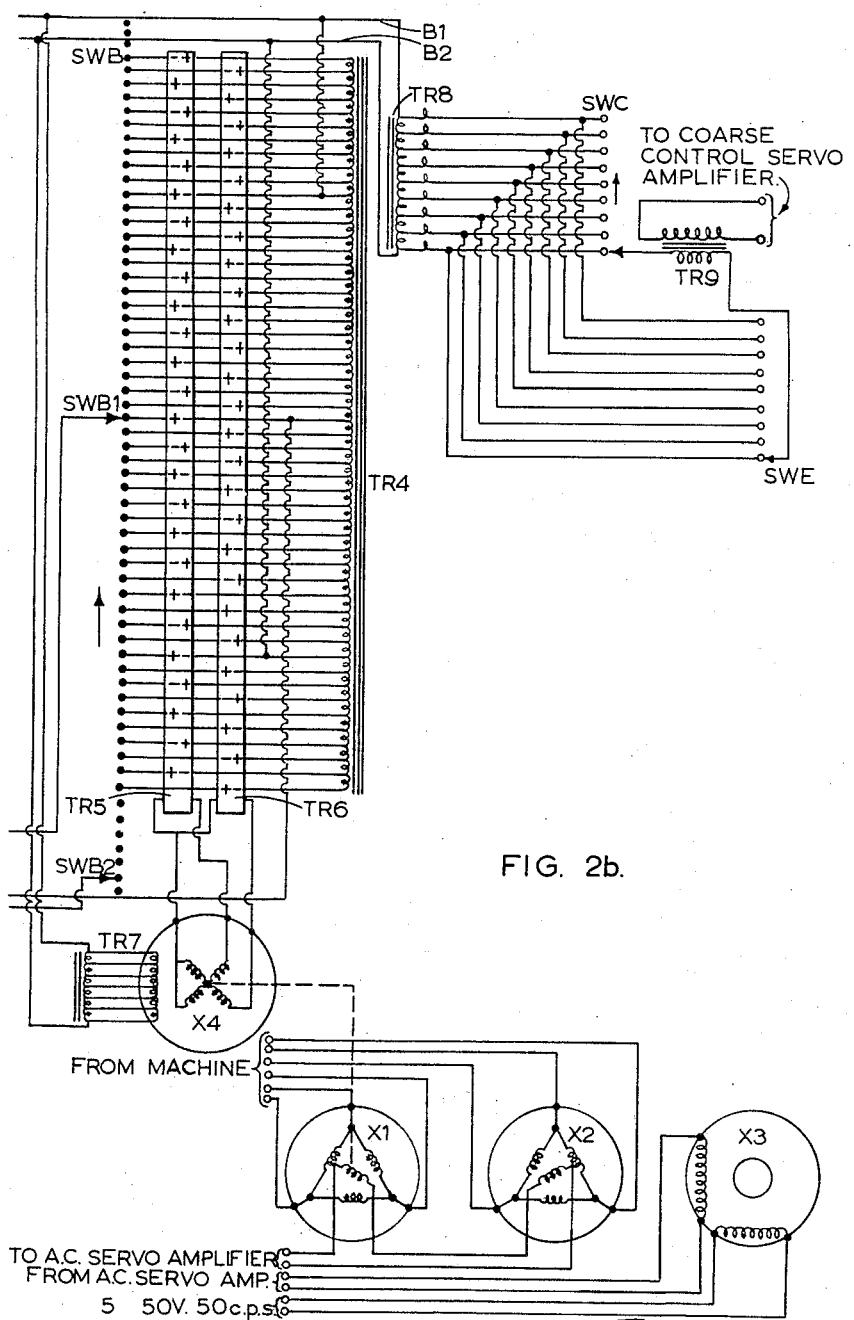

In order that the invention may be clearly understood and readily carried into effect, the invention will be described with reference to the accompanying drawings, in which:

Figure 1 illustrates in block form the position analogue unit of an automatic control system for a machine tool, and Figs. 2a and 2b taken together constitute a circuit diagram of the electrical part of the position analogue unit.

The control system shown in the drawing is intended for controlling automatically the position of a work-table of a machine tool and the invention is concerned primarily with the expedient used for setting up the error signal for the servo-motor, which is denoted symbolically by the reference M in Figure 2, in which figure the work-table is denoted by the reference WT. The displacement of the work-table is achieved in well known manner by a lead screw driven by the servo-motor and engaging a nut attached to the work-table. An essential step in deriving the error signal is setting up a voltage, which is an alternating voltage in the present example, which varies in response to the position of the worktable. Such a voltage could be derived from a variable potential divider such as a tapped autotransformer energized from a fixed reference voltage and having a selector driven by the lead screw of the motor M so as to derive voltage from one or other of the taps on the autotransformer. However in the system being described several stages of division are employed, to achieve high accuracy and to enable the potential dividers and other components of the control system to be mechanically separated from the controlled machine, the potential dividers are driven by a motor X3 (Figures 1 and 2) which is locked to the motor M by means of two magslip or synchro-loops, the transmitters of which are driven by the motor M. These transmitters are denoted in Figure 2 by the references TX1 and TX2, the loop including TX2 is provided to give coarse control of the motor X3, whereas the loop including TX1 is provided to give fine or vernier control of the motor X3. For this reason a step-up gear is provided between TX2 and TX1, so that a given angular displacement of the rotor of the transmitter TX2 corresponds to a much smaller angular displacement of the rotor of the transmitter TX1. The receivers of the synchro or magslip loops are denoted in Figures 1 and 2 by the references X1 and X2, and it will be understood that alternating voltages will be set up across the rotors of these receivers which have amplitudes representative of relative angular displacements between these rotors and the rotors of the corresponding transmitters TX1 and TX2. The voltages set up across the rotors of X1 and X2 therefore represent on a course and fine scale respectively the error in the angular displacement of shafts driven by the motor X3, measured with respect to the angular displacement of the lead screw driven by the motor M. Voltages derived from the rotor windings of X1 and X2 are combined as indicated in Figure 2, amplified in an alternating current amplifier (not shown) and then applied to a field winding FW of the motor X3 so as to cause the motor to rotate the shaft on which are mounted the rotors of X1 and X2. The sense of the rotation is to reduce the voltage across the rotors of X1 and X2 and in practice the gain of the amplifier between X1 and X2 on the one hand and the motor X3 on the other hand is sufficient to enable the motor X3 to maintain the input to the amplifier vanishingly small. In this way the shaft of the motor X3 represents on a suitable scale and without appreciable error the rotation of the lead screw driven by the servo-motor M. The table load is however removed from the motor X3, so that the arrangement for deriving the voltage responsive to the rotation of the lead screw of the motor M can be a highly accurate lightly loaded arrangement. The voltage responsive to the rotation of the lead screw is referred to hereinafter as the position anologue signal.

The apparatus so far described forms by itself no part of the present invention and is indeed conventional. The description has been given only so that the background to the invention may be understood. Moreover, Figure 1 has been provided to show the velocity ratio which exist between the various rotary switches, and the rotary transformer which form part of the system illustrated in Figure 2. Thus, the position analogue signal is derived by a variable linkage transformer X4, and by switches SWB, SWA and SWC, which are driven by the motor X3 through successive gear trains G1 to G4 which have step down ratios as shown in Figure 1 of the drawing.

The transformer X4 and the switch SWB set up digital contributions of two lower denominational orders for the position analogue signal and they operate as described in the specification of U.S. Patent application Serial No. 484,202 which corresponds to published British patent specification No. 808,472. Thus the switch SWB is a stud switch, the studs of which are tapped to an autotransformer TR4 energized from a reference source of alternating voltage of 1000 c.p.s. this source being connected between the busbars B1 and B2. The studs are shown arranged in line for convenience of illustration, but are in practice arranged in a circle and the switch brushes SWB1 and SWB2 are mounted diammetrically opposite each other on the output shaft of the gear train G2. The output voltages picked up by the brushes SWB1 and SWB2 are used to provide the contributions of the lower order digits in alternate ranges of angular displacement of the switch SWA. The transformer X4 is of known construction and has two rotor windings which are mounted with their magnetic axes mutually at right angles, the rotor being driven by the output shaft of the gear train G1, which also drives the rotor of the magslip receiver X1. The stator winding of the transformer is energized by reference voltage from the busbars B1 and B2 via transformer TR7, and during successive quarter revolutions of the rotor shaft the rotor windings alternately pick up voltages which vary linearly with angle. These voltages are injected into the leads from TR4 by means of transformers TR5 and TR6. Each of these transformers has a single toroidal core with a primary winding connected across the respective rotor winding of the transformer X4. The transformer TR5 has a secondary winding in every alternate lead from TR4, whilst the transformer TR6 has a secondary winding in every intervening lead. The windings of the transformers TR5 and TR6 may each have only a single turn produced by passing the respective lead once only through the toroidal core as indicated in the drawing. Moreover the secondary windings of the transformer TR5, and similarly those of transformer TR6, are wound alternately in opposite senses as indicated by the plus and minus signs on the drawings. This is to allow for the fact that the outputs from the rotor windings of X4 change sign every half revolution. The brushes SWB1 and SWB2 advance by the distances between centres of adjacent studs for each quarter revolution of the rotor shaft of X4 and by virtue of the arrangement described the output voltage from SWB1 or SWB2, instead of varying in small steps as the brushes move from one stud to the next, varies smoothly between the values at the taps of the autotransformers TR4 by virtue of the contribution injected into the leads by the transformer X4, the step-down ratio of the transformers TR5 and TR6 being appropriately related to the step-down ratio of the gear train G2. It is apparent in the drawing that the output voltage is derived from between SWB1 (or SWB2 as the case may be) and the midpoint of the auto-transformer TR4. The transformer TR4 projects beyond the points of connection to the bus-bars B1 and B2 to allow for uncertainty in the timing of the switch SWA. Such considerations are fully explained in the specification of the aforesaid U.S. patent application Serial No. 484,202. The transformers TR2 and TR3 inject the combined contributions of X4 and TR4 into the output leads of the switch SWA.

The output voltage derived from the switch SWB is, having regard to the contribution made by the variable linkage transformer X4, an accurate analogue or representation of the angular displacement of the output shaft of the gear train G2, the voltage repeating itself during each half revolution of that output shaft, bearing in mind that the brushes SWB1 and SWB2 are alternately effective to derive the output voltage during successive half revolutions. The output shaft of G2 in addition to carrying the brushes SWB1 and SWB2 of the switch SWB, provides the input drive for a gear train G3, which has a step down ratio of 5:1 as indicated in Figure 1. The output voltage from the switch SWB therefore repeats itself ten times for each revolution of the output shaft of the gear train G3; in other words it provides a measure of the fractional displacement of the output shaft of G3 within one or another of successive units of displacement of G3, each unit being one tenth of a revolution. From the output voltage of SWB alone it is not of course possible to determine the unit to which the output voltage of SWB relates and the switch SWA is provided to resolve this ambiguity.

The switch SWA consists of brush SWA1 driven by the output shaft of the gear train G3. This brush traverses a series of studs (arranged in a circle) to which are connected the energising leads for a series of relays RLA to RLK each of which controls five relay switches, denoted as RLA1, RLA2, etc. The gear train G3 has a step down ratio such that the brush SWA1 moves a distance equal to that between centres of adjacent studs of the switch SWA for each half-revolution of the brushes SWB1 and SWB2. The usual symbols are adopted to show relay switches which are normally open and normally closed. For example the switches RLA1 to RLK4 are normally closed and are opened when the respective relays are energised and conversely in the case of the relay switches RLA3 and RLK3. The switch SWA is associated with an auto-transformer TR1 which comprises the potential divider for the switch SWA and it is divided into sections, the electrical connections to which can be controlled selectively by the relay switch RLA1 to RLK1 and RLA2 to RLK2. The output of the transformer TR1 is obtained at the point PA via one of the switches RLA3 to RLK3. To explain the operation of the switch SWA, assume that the brush SWA1 is in the position shown. The relay RLA is energised, and the switches RLA4 and RLA5 are opened. These switches prevent premature energisation of the relays RLB or RLK, since it is necessary for the brush SWA1 to be of the make-before-break type to ensure continuity of the output of the position analogue unit. The energisation of the relay RLA also reverses the switches RLA1, RLA2 and RLA3. This causes the transformer TR1, which is short circuited when all the relays are de-energised, to be open circuited between the points marked $f1$ and $f2$ and causes these points to be connected to the bus bars B1 and B2. Electro-motive forces $5k$, $6k$, $7k$, etc. (where $k$ is a constant) are then applied as indicated to bus bars B3 to B12 leading from the tapping points on the potential divider TR1 to the switches RLA3 to RLK3. Only the switch RLA3 is however closed, so that the position analogue signal which appears at the output point PA is equal to $5k$ plus the contribution of SWB which is suitably scaled by the aforesaid transformers TR2 and TR3 to represent the fractional part of the displacement, of which the number of unit parts is represented by the position of the switch brush SWA1.

It will be noted that the contribution to the position analogue signal set up at PA which is made by TR1 is $5k$, which can be taken as 5 units on the scale of the apparatus which does not correspond to the position of the brush SWA1. However, as will appear, the arrangement is such that the contribution of TR1 to the position analogue signal is always $5k$, and the effect of movement of the brush is to change the voltages applied by TR1 to the contacts of a switch SWD, which is used in setting up the command signal for the servo-motor M. In other words the brush SWA1 as it rotates in response to rotation of the lead screw of thee servo motor M produces the effect of rotating the transformer TR1 with respect to the contacts of SWD, so that instead of varying the position analogue signal the command signal is varied in the opposite sense. It will be understood that this has precisely the same effect as varying the position analogue signal.

As already indicated the contacts of the switch SWD are connected to the bus bars B3 to B12 from the transformer TR1 and the selector SWD1 of this switch is capable of selecting voltage from one of the contacts. In practice the brush SWD1 is displaced in response to signals derived from a record and representing values of one co-ordinate of a reference point in the locus to be traced by the tool of the machine with reference to the work-piece on the table WT. Such signals will be referred to as reference point signals. The arrangement shown in the drawings is intended for use in a control system in which a command signal is derived by interpolation within three reference point signals, and to achieve such interpolation provision has to be made for storing four or more reference point signals. Such storage is effected by the switch means which respond to the signals derived from the tape, and the same bus bars serve all the switch means, each of which may be of the construction described in co-pending United States Patent Application Serial No. 620,145. However, to simplify the description a signal derived without interpolation will be regarded as a command signal, and as the switch means responsive to signals derived from the record, switch SWD is shown having a selector SWD1 capable of selecting one of the bus bars B3 to B12, the selected bus bar representing the digit of highest order in the command signal. A transformer TR10 is shown for injecting a voltage representing the contribution of digits of lower order into the lead from the selector SWD1, such lower order contribution being derived for example in the manner described in patent application No. 31,535/55. The position analogue signal derived from PA is compared with the command signal in known manner, and the difference is employed as the error signal for the servo motor which displaces the worktable.

In order to explain the operation of SWA and SWD, assume that the position of the selector SWD1 corresponds to a command signal of 3. The selector derives from bus bar B6 an electro-motive force of $8k$, which it will be noted represents 3 units more than the contribution of TR1 to the position analogue signal. The voltage $8k$ derived by SWD has added to it the contribution of lower order supplied by the transformer TR10 and the resultant is one input signal to the amplifier MA for the servo motor M. The other input signal is the position analogue signal from PA, and the servo loop completed through X1, X2 and the motor X3 then tends to rotate the brushes of the switches SWA and SWB, and the rotor windings of X4 to equate the two input signals to the amplifier MA. In particular the motor M through the intermediary of the motor X3 brings the brush SWA1 to position 3 and energises the relay RLC. This displaces the connecting points of the bus bars B1 and B2 and takes them to $f3$ and $f4$, and as the contribution of TR1 to the position analogue signal remains equal to $5k$ (now derived with the aid of the switch RLD3) the contribution of highest order chosen by the switch device for the command signal is also $5k$. The servo loop will eventually settle with SWA1 in contact with the stud, corresponding to that selected by the selector SWD1, but displaced from the geometric centre of the stud by a distance which corresponds to the lower order contribution to the command signal injected by the transformer TR10. The work-table WT will then of course have received exactly the required displacement. The servo loop can thus produce the required equality without ambiguity. The action is of course similar if, say, with the brush SWA1 in the position indicated, which corresponds to zero displacement of the work-table WT, the selector for the command signal is in position 8, because it will then select an electro-motive force of $8k$, from TR1, and the signal applied to the servo-motor M will be of opposite sign to that in the first example, as it should be.

The arrangement so far described is operative as long as a command signal and the position analogue signal do not differ as to the value of the highest order retained digit by more than 5. Subject to these conditions, there is no ambiguity in the error signal derived by comparing the command and position analogue signal and this result is achieved by virtually shifting the potential divider formed by the transformer TR1 to produce relative displacement between the potential divider and a series of contacts therewith to connect each contact in succession to different taps so that neither of the output points from which the two signals are taken can move past an end of the potential divider. The total voltage between the bus bars need therefore correspond only to a fraction of the total range of displacement of the work-table WT, for during a table traverse through the full range of displacement, the transformer TR1 is virtually rotated once during each fractional part of the displacement. Therefore assuming a limit to the minimum voltage difference to which the servo-motor M can respond, the accuracy of the arrangement is increased by the number of times the full range of displacement is subdivided. The shifting of the potentiometer is responsive to the position of the brush SWA1 which in turn is responsive to the variable being controlled, namely the table position in the case considered. To facilitate such shifting of the potential divider, the transformer TR1 comprises a series of sections connected in cyclic formation by the switches RLA1 to RLK1 and the shifting is achieved by selectively open-circuiting the formation between two of the sections by operation of the switches.

Assuming that a particular command signal is set up by SWD1, together with the incremental voltage superimposed on the voltage selected by SWD1 corresponding to a required displacement within the range of displacement represented by the voltage between successive taps on TR1, this command signal is fed as one input to a servo amplifier, the feedback signal to which is the position analogue signal derived from TR1 together with voltages superimposed by TR2 or TR3. The servo motor therefore operates to drive the table in a sense such as to tend to bring the mid-point of the potential divider towards the tapping of SWD1 and SWD. The displacement of the table is transmitted with appropriate gearing to the coarse and fine transmitters corresponding to the receivers X2 and X1 whereby the motor X3 operates to drive the switch SWB and therefore also the switch SWA, so that the system is driven to cause the position analogue signal to approach the command signal at which point the system is rebalanced.

To provide for the contingency that the difference between the command and position analogue signals may sometimes be greater than can be handled by the arrangement so far described, the transformer TR8 and the switch SWC are provided to set up a representation of the digit of highest denominational order needed to give an absolute indication of the worktable position, whilst switch means, illustrated simply as the switch SWE, is provided to give, in conjunction with TR8, a comparable representation of the corresponding digit of the command signal. The output of the two switches SWC and SWE are subtracted by the transformer TR9 and the difference forms of error signal for a course control servo motor. If required an approximation to the lower order digits may be included in the outputs of the switches SWC and SWE.

In the control system for which the arrangement shown is intended, interpolation is employed to derive from discrete reference point signal a virtually continuously variable command signal, but the invention is not restricted to the derivation of the command signal by interpolation. However, if the command signal is derived by interpolation within reference point signals, the digits of highest order which are all derived from TR1, it will be appreciated that such digits in each of these signals should not normally differ from the corresponding digit of the position analogue signal by more than 5.

The means illustrated for shifting the potential divider formed by TR8 may be modified in many ways. Moreover the command and feedback signals which are compared may be derived from different potential divider means providing provision is made for shifting them in unison. The relay switches RLA4 to RLK4 and RLA5 to RLK5 can also be dispensed with by having two contacts on the brush SWA1, spaced by the distance between centres of adjacent studs of the switch SWA and by having a switch in the earth lead from each brush, these switches being normally open and being closed alternately under the control of the brushes SWB1 and SWB2. The shifting of the potentiometer formed by TR8 does not interfere with the operation of SWB, since the contribution of the lower order digits is injected by transformers into the bus bars B3 to B12. The contribution of the lower order digits therefore "float" with the bus bars. The means for forming the contribution of lower order digits may also be modified in many ways and may indeed be dispensed with in some cases.

What we claim is:

1. An automatic control system comprising a servo motor and an element displaceable by said servo motor, a potential divider having a series of taps, a series of output contacts, means for producing relative displacement between said potential divider and said contacts to connect each contact in succession to different taps, a selector, means for producing relative displacement between said selector and said contacts to derive a first potential from a selected one of said contacts, a differencing circuit, means for applying said first potential to said differencing circuit, means for deriving a second potential intermediate the potentials of the terminals of said potential divider and for applying said second potential to said differencing circuit, said servo motor being responsive to the output of said differencing circuit to displace said element, and one of said means for producing relative displacement being responsive to displacement of said element, whereby said servo motor tends to displace said element in response to said other means for producing relative displacement.

2. An automatic control system comprising a servo motor and an element displaceable by said servo motor, a potential divider having a series of taps, a series of output contacts, first displacement means for producing relative displacement between said potential divider and said contacts to connect each contact in succession to different taps, a selector, second displacement means for producing relative displacement between said selector and said contacts to derive a first potential from a selected one of said contacts, a differencing circuit, means for applying said first potential to said differencing circuit, means for deriving a second potential intermediate the potentials of the terminals of said potential divider and for applying said second potential to said differencing circuit, said servo motor being responsive to the output of said differencing circuit to displace said element, said first displacement means being responsive to displacement of said element, whereby said servo motor tends to displace said element in response to said second displacement means.

3. An automatic control system according to claim 2, said second potential being derived from a fixed point on said potential divider and said first displacement means being operative in response to said servo motor to tend to connect the contact selected by said selector to the tap of the potential divider nearest said fixed point.

4. An automatic control system according to claim 3, said potential divider comprising a series of sections in cyclic formation and said first displacement means comprising means for selectively open-circuiting the connection between two of said sections.

5. An automatic control system according to claim 2, means being provided for superimposing on said second potential an incremental voltage which is a fractional part of the voltage difference between adjacent taps and is variable in response to said element to represent displacement of said element within intervals corresponding to the potential difference between successive taps.

6. An automatic control system according to claim 5 comprising means for superimposing on said first potential an incremental potential which is variable to represent the desired displacement within intervals corresponding to the potential difference between successive taps.

7. An automatic control system comprising a servo motor and an element displaceable by said servo motor, an autotransformer having a series of taps, a series of output contacts, means for producing relative displacement between said autotransformer and said contacts to connect each contact in succession to different taps, a selector, means for producing relative displacement between said selector and said contacts to derive a first potential from a selected one of said contacts, a differencing circuit, means for applying said first potential to said differencing circuit, means for deriving a second potential intermediate the potentials of the terminals of said autotransformer and for applying said second potential to said differencing circuit to produce an output from said differencing circuit representing the difference of said first and second potentials, said servo motor being responsive to the output of said differencing circuit to displace said element, and one of said means for producing relative displacement being responsive to displacement of said element, whereby said servo motor tends to displace said element in response to said other means for producing relative displacement.

8. A system according to claim 7, comprising a fixed tap in said autotransformer for the derivation of said second potential, and said first displacement means comprising means operative in response to said servo motor to tend to connect a contact selected by said selector to that one of said series of taps on the autotransformer nearest said fixed tap.

References Cited in the file of this patent

UNITED STATES PATENTS

| | | |
|---|---|---|
| 2,446,532 | Edwards | Aug. 10, 1948 |
| 2,715,703 | Schuck | Aug. 16, 1955 |